United States Patent
Put et al.

(10) Patent No.: US 10,847,782 B2
(45) Date of Patent: Nov. 24, 2020

(54) POWDER, ELECTRODE AND BATTERY COMPRISING SUCH A POWDER

(71) Applicant: Umicore, Brussels (BE)

(72) Inventors: Stijn Put, Olmen (BE); Dirk Van Genechten, Koersel (BE); Jan Gilleir, Mortsel (BE); Nicolas Marx, Geel (BE)

(73) Assignee: Umicore, Brussels (BE)

( * ) Notice: Subject to any disclaimer, the term of this patent is extended or adjusted under 35 U.S.C. 154(b) by 32 days.

(21) Appl. No.: 15/538,292

(22) PCT Filed: Oct. 15, 2015

(86) PCT No.: PCT/EP2015/073880
§ 371 (c)(1),
(2) Date: Jun. 21, 2017

(87) PCT Pub. No.: WO2016/102098
PCT Pub. Date: Jun. 30, 2016

(65) Prior Publication Data
US 2017/0346073 A1    Nov. 30, 2017

Related U.S. Application Data

(63) Continuation-in-part of application No. PCT/EP2015/073880, filed on Oct. 15, 2015.

(30) Foreign Application Priority Data

Dec. 23, 2014   (WO) .................. PCT/EP2014/079188

(51) Int. Cl.
*H01M 4/02* (2006.01)
*H01M 4/134* (2010.01)
(Continued)

(52) U.S. Cl.
CPC ............. *H01M 4/134* (2013.01); *C01B 32/00* (2017.08); *C01B 33/02* (2013.01); *H01M 4/362* (2013.01);
(Continued)

(58) Field of Classification Search
CPC ....................................... H01M 2/02
See application file for complete search history.

(56) References Cited

U.S. PATENT DOCUMENTS 6,589,696 B2   7/2003   Matsubara et al.
8,062,556 B2   11/2011  Peres et al.
(Continued)

FOREIGN PATENT DOCUMENTS

EP   1722429 A2        11/2006
JP   2002-373653   *   12/2002
(Continued)

OTHER PUBLICATIONS

Hongfa, X., et al., "Graphene/nanosized Silicon Composites for Lithium Battery Anodes with Improved Cycling Stability", Carbon, vol. 49 (Jan 1, 2011), pp. 1787-1796.
(Continued)

*Primary Examiner* — Jacob B Marks
(74) *Attorney, Agent, or Firm* — NK Patent Law

(57) ABSTRACT

Powder comprising particles comprising a matrix material and silicon-based domains dispersed in this matrix material, whereby either part of the silicon-based domains are present in the form of agglomerates of silicon-based domains whereby at least 98% of these agglomerates have a maximum size of 3 µm or less, or the silicon-based domains are not at all agglomerated into agglomerates.

16 Claims, 2 Drawing Sheets

Figure 1:
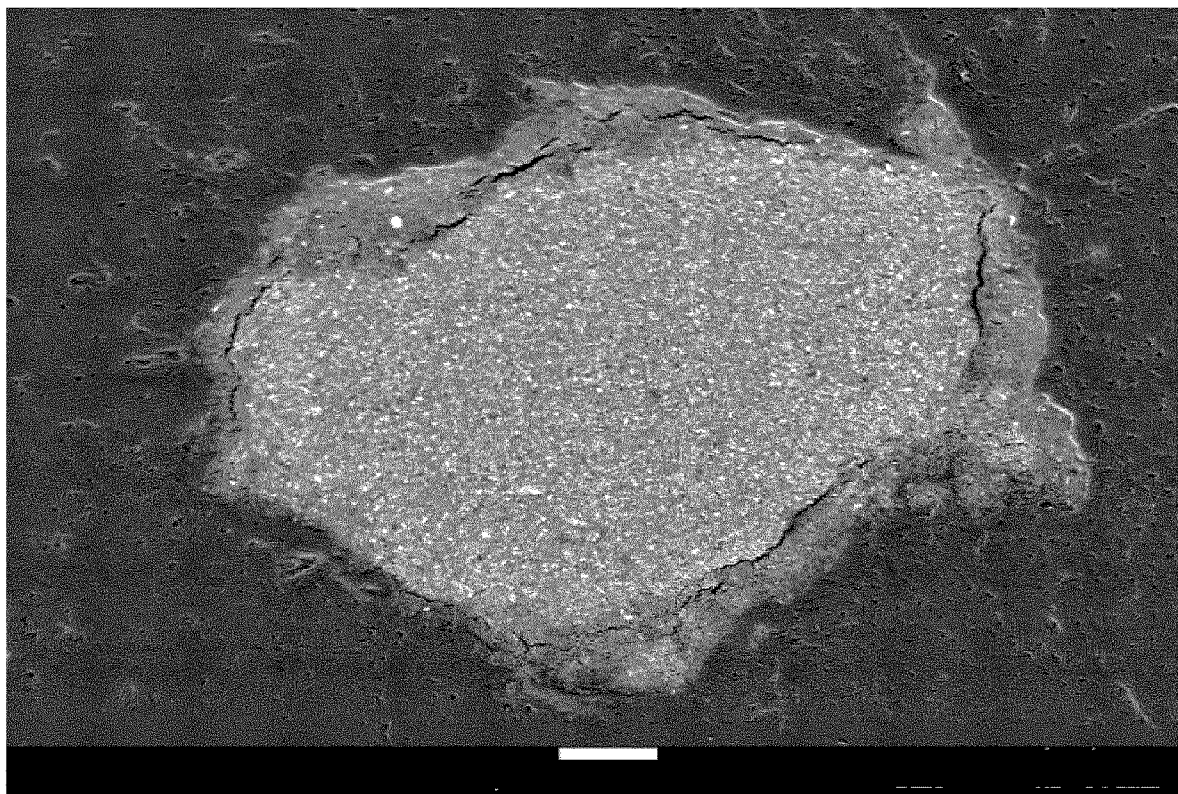

(51) Int. Cl.
  *H01M 4/36* (2006.01)
  *C01B 33/02* (2006.01)
  *C01B 32/00* (2017.01)
  *H01M 4/38* (2006.01)

(52) U.S. Cl.
  CPC ......... *H01M 4/386* (2013.01); *C01P 2006/12* (2013.01); *C01P 2006/14* (2013.01)

(56) References Cited

U.S. PATENT DOCUMENTS

| | | | |
|---|---|---|---|
| 8,124,279 | B2 | 2/2012 | Petrat et al. |
| 8,158,282 | B2 | 4/2012 | Zhamu et al. |
| 8,241,793 | B2 | 8/2012 | Zhamu et al. |
| 2005/0074672 | A1 | 4/2005 | Matsubara |
| 2006/0134516 | A1 | 6/2006 | Im et al. |
| 2009/0269677 | A1* | 10/2009 | Hirose ............... H01M 4/134 429/338 |
| 2010/0075227 | A1* | 3/2010 | Morita ............... H01M 4/131 429/231.8 |
| 2014/0234722 | A1 | 8/2014 | Kyotani |
| 2014/0255785 | A1 | 9/2014 | Do |
| 2014/0287315 | A1 | 9/2014 | Troegel |

FOREIGN PATENT DOCUMENTS

| | | |
|---|---|---|
| WO | 20140172914 | 10/2014 |
| WO | 20150117838 | 8/2015 |

OTHER PUBLICATIONS

International Search Report for PCT/EP2015/073880, dated Jan. 5, 2016.

Taiwanese Office Action for Application No. 104142742.

Kuksenko, S.P., "Silicon-Containing Anodes with High Capacity Loading for Lithium-Ion Batteries", Russian Journal of Electrochemistry, vol. 50, No. 6, Jun. 1, 2014, pp. 537-547.

USPTO—Final Office Action for U.S. Appl. No. 15/538,698, dated Feb. 8, 2019.

USPTO; Final Office Action for U.S. Appl. No. 15/538,698 dated Sep. 20, 2019, 17 pages.

USPTO, Non-Final Office Action for U.S. Appl. No. 15/538,698, dated Jun. 3, 2019, 13 pages.

* cited by examiner

POWDER, ELECTRODE AND BATTERY COMPRISING SUCH A POWDER

This application is a National Stage application of International Application No. PCT/EP2015/073880, filed Oct. 15, 2015. This application also claims priority to International Application No. PCT/EP2014/079188, filed Dec. 23, 2014.

The present invention relates to a powder, more specifically for use, either or not after further processing, in an electrode of a battery, and to an electrode and a battery comprising such a powder.

BACKGROUND

Lithium ion (Li-ion) batteries are currently the best performing batteries and already became the standard for portable electronic devices. In addition, these batteries already penetrated and rapidly gain ground in other industries such as automotive and electrical storage. Enabling advantages of such batteries are a high energy density combined with a good power performance.

A Li-ion battery typically contains a number of so-called Li-ion cells, which in turn contain a positive (cathode) electrode, a negative (anode) electrode and a separator which are immersed in an electrolyte. The most frequently used Li-ion cells for portable applications are developed using electrochemically active materials such as lithium cobalt oxide or lithium nickel manganese cobalt oxide for the cathode and a natural or artificial graphite for the anode.

It is known that one of the important limitative factors influencing a battery's performance and in particular battery's energy density is the active material in the anode. Therefore, to improve the energy density, newer electrochemically active materials based on e.g. tin, aluminium and silicon were investigated and developed during the last decades, such developments being mostly based on the principle of alloying said active material with Li during Li incorporation therein during use.

The best candidate seems to be silicon as theoretical capacities of 4200 mAh/g (gravimetric) or 2200 mAh/cm$^3$ (volumetric) can be obtained and these capacities are far larger than that of graphite (372 mAh/g) but also those of other candidates.

Note that throughout this document silicon is intended to mean the element Si in its zerovalent state. The term Si will be used to indicate the element Si regardless of its oxidation state, zerovalent or oxidised.

However, one drawback of using a silicon based electrochemically active material in an anode is its large volume expansion during charging, which is as high as 300% when the lithium ions are fully incorporated, e.g. by alloying or insertion, in the anode's active material—a process often called lithiation. The large volume expansion of the silicon based materials during Li incorporation may induce stresses in the silicon, which in turn could lead to a mechanical degradation of the silicon material.

Repeated periodically during charging and discharging of the Li-ion battery, the repetitive mechanical degradation of the silicon electrochemically active material may reduce the life of a battery to an unacceptable level.

In an attempt to alleviate the deleterious effects of the volume change of the silicon, many research studies showed that by reducing the size of the silicon material into submicron or nanosized silicon domains, typically with an average size smaller than 500 nm and preferably smaller than 150 nm, and using these as the electrochemically active material may prove a viable solution.

In order to accommodate the volume change composite particles are usually used in which the silicon domains are mixed with a matrix material, usually a carbon based material, but possibly also a silicon based alloy or $SiO_2$.

Further, a negative effect of silicon is that a thick SEI, a Solid-Electrolyte Interface, may be formed on the anode. An SEI is a complex reaction product of the electrolyte and lithium, and therefore leads to a loss of lithium availability for electrochemical reactions and therefore to a poor cycle performance, which is the capacity loss per charging-discharging cycle. A thick SEI may further increase the electrical resistance of a battery and thereby limit the achievable charging and discharging rates.

In principle the SEI formation is a self-terminating process that stops as soon as a 'passivation layer' has formed on the silicon surface. However, because of the volume expansion of silicon, both silicon and the SEI may be damaged during discharging (lithiation) and recharging (de-lithiation), thereby freeing new silicon surface and leading to a new onset of SEI formation In the art, the above lithiation/de-lithiation mechanism is generally quantified by a so-called coulombic efficiency, which is defined as a ratio (in % for a charge-discharge cycle) between the energy removed from a battery during discharge compared with the energy used during charging. Most work on silicon-based anode materials is therefore focused on improving said coulombic efficiency by means of reducing the volume variations during charge—discharge cycling.

Current methods to make such silicon based composites are based on mixing the individual ingredients (e.g. silicon and the intended matrix material or a precursor for the intended matrix material) during preparation of the electrode paste formulation, or by a separate composite manufacturing step that is then carried out via dry milling/mixing of silicon and host material (possible followed by a firing step), or via wet milling/mixing of silicon and host material (followed by removal of the wet medium and a possible firing step).

Known disclosures of methods for making composite powders comprising a host material and a silicon-based powder dispersed therein are U.S. Pat. No. 8,124,279, U.S. Pat. No. 8,241,793 and U.S. Pat. No. 8,158,282. For example in U.S. Pat. No. 8,124,279 a composite of nanoscale silicon aggregate particles in a carbon-based material, is disclosed. The carbon-based material can be a mixture of a powder of particulate graphite having a mean particle diameter of from 1 μm to 100 μm; a conductive carbon black and a binder.

U.S. Pat. No. 8,062,556 also discloses a manufacturing method for the preparation of a silicon-carbon nanocomposite wherein a silicon-based powder having particles with a size of less than 100 nm is mixed with a carbon containing polymer and subsequently pyrolyzed. The silicon-carbon nanocomposite is utilized as an active material in the preparation of an electrode for Li-ion batteries, said electrode further including carbon black and a binder.

Also in US2005/074672, EP1722429 and Xiang et al, CARBON 49 (2011) 1787-1796 methods for preparing silicon based composites are disclosed. However, in these cases an amount of nano silicon powder was simply mixed with graphite. It is an achievement of the present invention to recognize that, mainly due to its nanometric size, such silicon powders will strongly agglomerate into micron size agglomerates, which are not easily broken up, at least not by standard processing steps.

Standard mixing, without specific measures to avoid these agglomerates breaking up, will therefore lead to agglomerates of nano silicon particles in the final composite, which, as recognized by the present invention, are sub-optimal.

In US 2014/0255785 and US 2014/0234722 composites having individual silicon particles are described. These silicon particles are embedded in a loose layer of graphene nanoplatelets or graphene sheets, leading to a porous structure with a high surface area.

This has the following disadvantages: The specific surface area, as indicated by a BET measurement, leads to excessive SEI formation. Further, the density will be low, leading to a low volumetric energy storage capacity.

Despite the advances in the art of negative electrodes and electrochemically active materials contained therein, there is still a need for yet better electrodes that have the ability to further optimize the performance of Li-ion batteries. In particular, for most applications, negative electrodes having improved capacities and coulombic efficiencies are desirable.

Therefore, the invention concerns a powder comprising particles comprising a matrix material and silicon-based domains dispersed in this matrix material, whereby either
  part of the silicon-based domains are present in the form of agglomerates of silicon-based domains and at least 98% of these agglomerates have a maximum size of 3 µm or less, or
  the silicon-based domains are not at all agglomerated into agglomerates.

In other words, the silicon based domains and the matrix material form a dispersion, so a system in which particles, in this case the silicon based domains, are dispersed in a continuous phase of a different composition or state, in this case the matrix material.

In other words either part of the silicon-based domains are present in the form of agglomerates of silicon-based domains whereby $d_{98} \leq 3$ µm or the silicon-based domains are not at all agglomerated, Herein $d_{98}$ is the $98^{th}$ percentile of the distribution of the maximum sizes of the agglomerates.

By a silicon-based domain is meant a cluster of mainly silicon atoms having a discrete boundary with the matrix. The silicon content in such a silicon-based domain is usually 80 weight % or more, and preferably 90 weight % or more.

The silicon based domains and agglomerates thereof may be observed via microscopic techniques of cross-sections of the particles of the powder. Via these microscopic techniques also the maximum size of agglomerates, if they are present, may be determined.

An agglomerate is a group of silicon based domains wherein the domains are in contact, usually single point contact, with each other.

Such an agglomerate will usually be free or nearly free from matrix material. Therefore the absence, or near absence, of matrix material in between silicon based domains positively identifies these domains as belonging to a single agglomerate. The reverse is not necessarily true: the presence of matrix material is not sufficient to determine that a group of silicon based domains is not a cluster.

For clarity it is remarked that the mentioned percentages concern the number of agglomerates with certain maximum sizes, not the weight that they represent.

If light microscopy or SEM techniques provide insufficient contrast between the silicon based domains, or agglomerates of these, and the matrix material, element mapping methods using EDX or EDS of these cross-sections may be used, whereby low signals, or no signals at all, for elements indicative of the matrix material may be used to determine the presence and size of agglomerates of silicon-based domains.

The maximum size of an agglomerate or domain is the largest measurable straight-line distance between two points on the periphery of the agglomerate or domain.

In practice, such a silicon-based domain can be either a cluster of mainly silicon atoms in a matrix made from different material or a discrete silicon particle. A plurality of such silicon particles is a silicon powder, so that the silicon-based domains can be considered to be a silicon powder.

The powder of the invention may be one of several types:
  Carbon-based composite powder, in which a separately produced silicon nano or submicron powder is agglomerated with separately produced carbon and/or a carbon precursor acting as the matrix. In this case the silicon domains are formed by the actual discrete silicon particles from the silicon nano or submicron powder.
  So-called $SiO_x$ particles, whereby overall x=typically 0.2-1.8. From investigations it has become apparent that this overall formula consists of silicon domains in a $SiO_2$ matrix. Such composite particles are formed by gas phase nucleation.
  Silicon alloy, in which the other metal or metals in the alloy or an intermetallic phase of the other metal or metals with silicon form the matrix material and preferably are one or more metals of the group consisting of Sn, Ti, Fe, Ni, Cu, Co and Al. Such alloys are typically formed by alloying process, during which submicron or nanometre sized silicon domains are formed.

The silicon-based domains may have a thin surface layer of silicon oxide.

The silicon-based domains may have any shape, e.g. substantially spherical but also whiskers, rods, plates, fibres and needles, etc.

For clarity it is remarked that that the silicon-based domains are nano-sized, having a mass-based average diameter d50 which is less than 500 nm and preferably less than 150 nm. It is further noted that a small size of the silicon-based domains is considered as a boundary condition, without which a good composite cannot be produced.

Moreover, the composite powder itself comprises mainly micron-sized particles. It has a specific surface area as measured by the BET technique, of less than 10 m$^2$/g, preferably of less than 5 m$^2$/g and more preferably of less than 2 m$^2$/g The composite powder according to the invention has a better cycle performance than traditional powders. Without being bound by theory the inventors speculate that this is at least partly related to the fact that the powder according the invention will suffer less from the known negative effects of swelling and shrinkage of the silicon than traditional powders, because the silicon is better dispersed. This positive effect is surprising because also in the traditional powders which have agglomerates of silicon based domains the expectation would be that within an agglomerate there should be sufficient free space to allow expansion.

Further, such a powder according to the invention will have thereby indirectly have a strongly reduced tendency for SEI formation compared to traditional powders with agglomerated silicon-based domains, and also thereby gain in electrochemical performance.

In a preferred embodiment either part of the silicon-based domains are present in the form of agglomerates of silicon-based domains and at least 98% of these agglomerates have a maximum size of 2 μm or less, and preferably 1 μm or less, or the silicon-based domains are not at all agglomerated into agglomerates.

In a further preferred embodiment, the silicon-based domains are not agglomerated at all into agglomerates with a maximum size of more than 3 μm and are preferably not agglomerated at all into agglomerates with a maximum size of more than 1 μm.

Possibly the matrix is carbon, e.g. thermally decomposed pitch or a precursor material that can be converted into carbon by thermal treatment, e.g. pitch. Such a powder has been shown to give good performance in a battery.

In a preferred embodiment the silicon-based domains are silicon-based particles, meaning that they were, before forming the composite, individually identifiable particles that existed separately from the matrix, so that they were not formed together with the matrix.

In another preferred embodiment the silicon-based particles are preferably free from other elements than Si and O, so consist of silicon and oxidised Si, not taking inevitable impurities into account.

In yet another preferred embodiment the particles of the powder according to the invention contain only or nearly only said silicon based domains and said matrix material, in other words contain at least 90% by weight of said silicon based domains and said matrix material.

In yet a further embodiment the powder contains a carbonaceous material, preferably graphite, whereby the silicon-based domains are not embedded in the carbonaceous material.

In an alternative embodiment the powder of the invention only or nearly only consists of said particles so that it contains at least 95% by weight of said particles.

The invention further concerns an electrode for an electrochemical cell comprising the powder of the invention and a battery containing such an electrode.

Preferably the composite powder contains between 2 weight % and 25 weight % of silicon, and preferably between 8 weight % and 15 weight % of silicon. It preferably has an average particle diameter d50 of between 1 and 20 microns.

Figure 2:
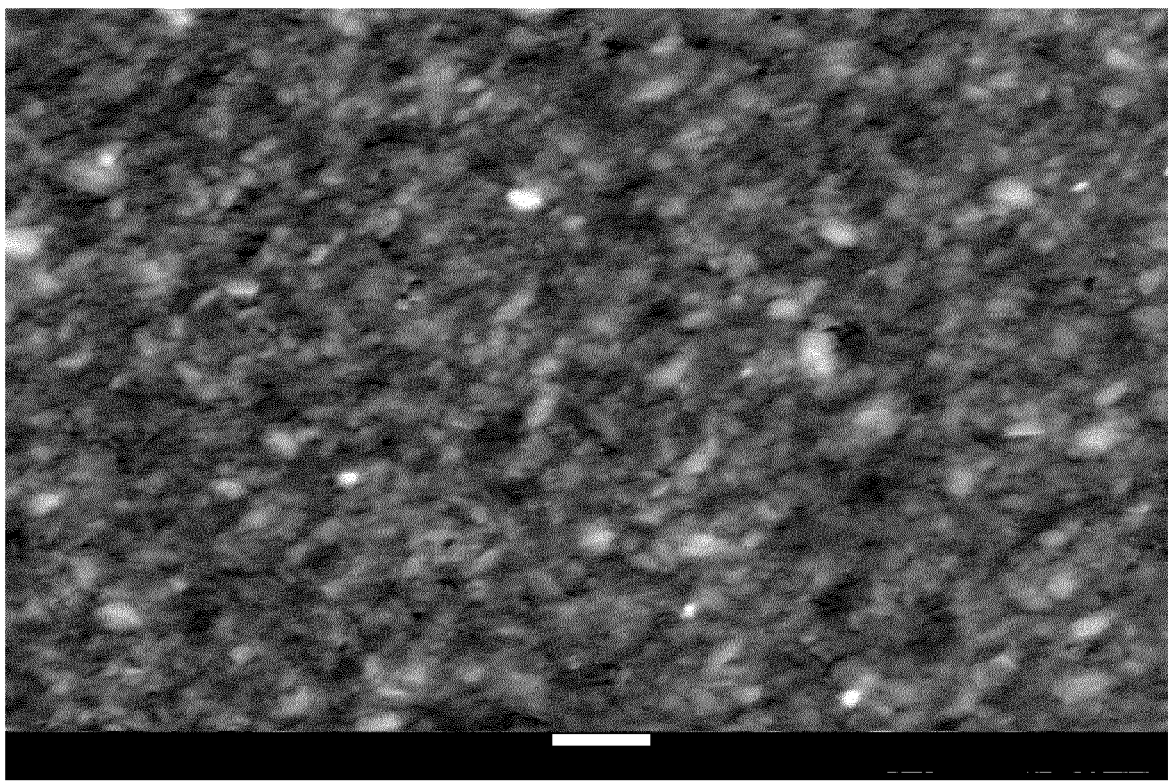

The invention will be further explained by the following examples and counterexamples, and illustrated by FIG. 1, which shows a SEM image of a particle of a powder according the invention, whereby the white bar represents 5 μm, and FIG. 2, which represents a part of the SEM image of FIG. 1 on a larger scale, whereby the white bar represents 1 μm Analytical methods used Determination of Oxygen Content The oxygen contents of the powders in the examples and the counterexamples were determined by the following method, using a Leco TC600 oxygen-nitrogen analyzer.

A sample of the powder was put in a closed tin capsule that was put itself in a nickel basket. The basket was put in a graphite crucible and heated under helium as carrier gas to above 2000° C.

The sample thereby melts and oxygen reacts with the graphite from the crucible to CO or CO2 gas. These gases are guided into an infrared measuring cell. The observed signal is recalculated to an oxygen content.

Determination of Electrochemical Performance

All composite powders to be tested were sieved using a 45 μm sieve and mixed with carbon black, carbon fibres and sodium carboxymethyl cellulose binder in water (2.5 wt %). The ratio used was 90 weight parts composite powder/3 weight parts carbon black/2 weight parts carbon fibres and 5 weight parts carboxymethyl cellulose (CMC).

These components were mixed in a Pulverisette 7 planetary ball mill in two stages of 10 minutes at 500 rpm.

A copper foil cleaned with ethanol was used as current collector. A 125 μm thick layer of the mixed components was coated on the copper foil. The coating was dried for 45 minutes in vacuum at 50° C. A 1.27 cm$^2$ circle was punched from the dried coated copper foil and used as an electrode in a coin cell using lithium metal as counter electrode. The electrolyte was 1 M LiPF$_6$ dissolved in EC/DEC 1/1+ 2%VC+10% FEC solvents. All samples were tested in a coin-cell tester with high precision (Maccor 4000 series).

The first discharge capacity and the coulombic efficiency of repeated charging and discharging cycles was determined. The coulombic efficiency of the 9$^{th}$ cycle is reported, as this is representative for the average between the 5$^{th}$ and the 100$^{th}$ cycle.

The skilled person will be aware that a small difference in coulombic efficiency per cycle, will have, over the hundreds or thousands of charging-discharging cycles a battery is expected to last, a significant cumulative effect.

Determination of Agglomerate Size

The maximum sizes of agglomerates of silicon particles was determined by SEM imagery by measuring the largest measurable distance between two points on the periphery of an agglomerate. Silicon and pitch, either as is or decomposed, could be easily distinguished visually, so silicon agglomerates could be easily identified by the prevalence of silicon, but especially by the absence of pitch.

The same procedure was repeated for the determination of agglomerates having a maximum size of below 0.5 μm, however the SEM micrographs were taken with a higher magnification (preferably above 50.000×). To aid in the counting and size measurement image analysis software was used. To obtain reliable data at least 100 agglomerates were measured having a maximum size of at least 0.5 μm, if such agglomerates were present.

The samples were prepared according to well-known methodologies, e.g. by embedding them in resin followed by cutting and polishing to provide a smooth cross-section thereof.

EXAMPLE 1

A submicron-sized silicon powder was obtained by applying a 60 kW radio frequency (RF) inductively coupled plasma (ICP), using argon as plasma gas, to which a micron-sized silicon powder precursor was injected at a rate of 220 g/h, resulting in a prevalent (i.e. in the reaction zone) temperature above 2000K. In this first process step the precursor became totally vaporized. In a second process step an argon flow was used as quench gas immediately downstream of the reaction zone in order to lower the temperature of the gas below 1600K, causing a nucleation into metallic submicron silicon powder. Finally, a passivation step was performed at a temperature of 100° C. during 5 minutes by adding 100 l/h of a N$_2$/O$_2$ mixture containing 0.15 mole % oxygen. The gas flow rate for both the plasma and quench gas was adjusted to obtain submicron silicon powder with an average particle diameter d$_{50}$ of 80 nm and a d$_{90}$ of 521 nm. In the present case 2.5 Nm$^3$/h Ar was used for the plasma and 10 Nm$^3$/h Ar was used as quench gas.

A blend was made of 16 g of the mentioned submicron silicon powder and 32 g petroleum based pitch powder.

This was heated to 450° C. under $N_2$, so that the pitch melted, and, after a waiting period of 60 minutes, mixed for 30 minutes under high shear by means of a Cowles dissolver-type mixer operating at 1000 rpm.

The mixture of submicron silicon in pitch thus obtained was cooled under $N_2$ to room temperature and, once solidified, pulverized and sieved to give a powder with an average particle diameter $d_{50}$ of 17.8 µm.

A SEM microscopic evaluation was performed to determine if the silicon particles in the silicon powder were agglomerated in the resulting composite powder. No agglomerates with a size of 0.5 µm or higher were found.

The oxygen content of the powder was 0.95 weight %.

A SEM micrograph is shown in FIGS. 1 and 2, whereby it can be seen that the distribution of the silicon particle throughout the pitch was very homogeneous. In these pictures the white colour indicates silicon particles and the dark colour indicates pitch.

Graphite (Showa Denko SCMG-AF) was added to the as-dried silicon powder/pitch blend by dry-mixing, to obtain a silicon powder/pitch/graphite mixture with a weight ratio of 1.0:2.0:7.6, respectively.

10 g of the obtained mixture was fired in a quartz boat in a tube furnace continuously flushed with argon and heated to 1000° C. at a heating rate of 3° C./min. The sample was kept at 1000° C. for 2 h. The heating was turned off and the sample was allowed to cool to room temperature under argon atmosphere. The sample was removed from the quartz recipient, milled for 15 min in a coffee mill, and sieved to obtain a composite powder having an average particle diameter $d_{50}$ of 13.6 µm. The oxygen content of the obtained composite powder was 0.8 weight %.

A SEM analysis was done to confirm that the size of the agglomerates had not grown due to the firing step. This was confirmed: No agglomerates with a size of 0.5 µm or higher were observed. No porosity was visually observed.

The specific surface area of the composite powder measured by the BET method was 1.8 $m^2/g$

EXAMPLE 2

500 g of a submicron-sized silicon powder, obtained as in Example 1, was mixed with 1000 g of petroleum based pitch powder.

In order to apply high shear, the blend was fed into a Haake process 11 extruder, equipped with a twin screw and heated to 400° C., with the screw running at a rotating speed of 150 rpm. The residence time in the extruder was 30 minutes.

The obtained extrudate, with silicon well dispersed in the pitch material, was cooled down to less than 50° C. The injection port of the extruder and the container in which the extrudate was collected were shielded from ambient air by flushing with $N_2$.

A part of the obtained extrudate was pulverized in a mortar, and sieved to give a powder with an average particle diameter $d_{50}$ of 15.9 µm.

A SEM microscopic evaluation was performed to determine if the silicon particles in the silicon powder were agglomerated in the resulting composite powder. No agglomerates with a size of 0.5 µm or higher were found.

The oxygen content of the powder was 0.98%.

Graphite (Showa Denko SCMG-AF) was added to the resulting silicon powder/pitch blend by dry-mixing, to obtain a silicon powder/pitch/graphite mixture with a weight ratio of 1.0:2.0:7.6, respectively.

Hereafter, the obtained mixture was fired and sieved as described in Example 1.

The average particle diameter $d_{50}$ of the obtained powder was 14.1 µm and the oxygen content was 0.79%

A SEM analysis was done to confirm that the size of the agglomerates had not grown due to the firing step. This was confirmed: No agglomerates with a size of 0.5 µm or higher were observed. No porosity was visually observed.

The specific surface area of the composite powder measured by the BET method was 3.7 $m^2/g$

COMPARATIVE EXAMPLE 1

16 g of a submicron-sized silicon powder, obtained as in Example 1, was dry-mixed with 32 g of petroleum based pitch powder.

This was heated to 450° C. under $N_2$, so that the pitch melted, and kept at this temperature for 60 minutes. No shear was applied.

The mixture of submicron silicon in pitch thus obtained was cooled under $N_2$ to room temperature and, once solidified, pulverized and sieved to give a composite powder with an average particle diameter $d_{50}$ of 11.2 µm. The oxygen content of the powder was 1.21%.

A SEM microscopic evaluation was performed to determine if the silicon particles in the silicon powder were agglomerated in the resulting composite powder. The following results were obtained, with all results in µm:

| d10 | d50 | d90 | d98 | d99 | Maximum size observed |
|---|---|---|---|---|---|
| 0.7 | 1.8 | 2.9 | 3.6 | 3.8 | 5.0 |

Graphite (Showa Denko SCMG-AF) was added to the resulting silicon powder/pitch blend by dry-mixing, to obtain a silicon powder/pitch/graphite mixture with a weight ratio of 1.0:2.0:7.6, respectively.

Hereafter, the obtained mixture was fired and sieved as described in Example 1. The average particle diameter $d_{50}$ of the obtained powder was 16 µm, and the oxygen content was 0.9%

The SEM microscopic evaluation of the silicon particles and agglomerates was repeated on the fired product. The following results were obtained, with all results in pm, showing that significant agglomeration of the silicon nanoparticles had occurred:

| d10 | d50 | d90 | d98 | d99 | Maximum size observed |
|---|---|---|---|---|---|
| 0.5 | 1.7 | 2.9 | 3.7 | 3.9 | 5.0 |

As can be seen the results are similar to the results on the unfired product. SEM images showed porosity, especially between the silicon particles making up an agglomerate of silicon particles.

The specific surface area measured by the BET method was 8.7 $m^2/g$

The electrochemical performance was determined on all products after firing, and is reported in table 1.

TABLE 1

| Product | d98 of silicon agglomerates (μm) before firing | d98 of silicon agglomerates (μm) after firing | 1$^{st}$ discharge capacity (mAh/g) | Coulombic efficiency at cycle 9 (%) |
|---|---|---|---|---|
| Example 1 | <0.5 | <0.5 | 645 | 99.46 |
| Example 2 | <0.5 | <0.5 | 646 | 99.51 |
| Comparative example 1 | 3.6 | 3.7 | 610 | 99.32 |

The invention claimed is:

1. A negative electrode powder comprising particles comprising a matrix material and silicon-based domains dispersed in the matrix material, wherein the matrix material is a continuous phase and the silicon content in the silicon-based domains is 80 wt % or more, and either
   a portion of the silicon-based domains are present in the form of agglomerates of the silicon-based domains and wherein at least 98% of the agglomerates have a maximum size of 3 μm or less, or
   the silicon-based domains are not at all agglomerated into agglomerates.

2. The powder according to claim 1, wherein at least 98% of the agglomerates of silicon based domains have a maximum size of 2 μm or less.

3. The powder according to claim 1, wherein at least 98% of the agglomerates of silicon based domains have a maximum size of 1 μm or less.

4. The powder according to claim 1, wherein all of the agglomerates of the silicon based domains have a maximum size of 3 μm or less.

5. The powder according to claim 1, wherein the powder contains less than 3 weight % of oxygen.

6. The powder according to claim 1, wherein the powder contains between 2 weight % and 25 weight % of silicon.

7. The powder according to claim 1, wherein the powder has an average particle diameter d50 of between 1 and 20 microns.

8. The powder according to claim 1, wherein the silicon-based domains have a mass-based average diameter d50 which is less than 500 nm.

9. The powder according to claim 1, wherein the silicon-based domains are silicon-based particles.

10. The powder according to claim 1, wherein the particles of the powder contain at least 90% by weight of said silicon-based domains and said matrix material.

11. The powder according to claim 1, wherein the powder has a BET value of less than 10 m$^2$/g.

12. The powder according to claim 1, wherein that the particles have a porosity of less than 20 volume %.

13. An electrode for an electrochemical cell comprising the powder of claim 1.

14. A battery containing the electrode of claim 13.

15. The powder of claim 1, further comprising a carbonaceous material, wherein the silicon-based domains are not embedded in the carbonaceous material.

16. The powder of claim 15, wherein the carbonaceous material comprises graphite.

* * * * *

UNITED STATES PATENT AND TRADEMARK OFFICE
CERTIFICATE OF CORRECTION

PATENT NO. : 10,847,782 B2
APPLICATION NO. : 15/538292
DATED : November 24, 2020
INVENTOR(S) : Stijn Put et al.

Page 1 of 1

It is certified that error appears in the above-identified patent and that said Letters Patent is hereby corrected as shown below:

On the Title Page

Item (63), "Continuation-in-part of application No. PCT/EP2015/073880, filed on Oct. 15, 2015." should be deleted.

Signed and Sealed this
Twelfth Day of January, 2021

Andrei Iancu
*Director of the United States Patent and Trademark Office*